United States Patent

[11] 3,553,355

[72] Inventor Hubert Forster
Darmstadt-Eberstadt, Germany
[21] Appl. No. 652,292
[22] Filed July 10, 1967
[45] Patented Jan. 5, 1971
[73] Assignee Fernseh GmbH
Darmstadt, Germany
a corporation of Germany
[32] Priority July 14, 1966
[33] Germany
[31] No. 49692

[54] METHOD OF STORING COMPOSITE COLOR SIGNALS
16 Claims, 7 Drawing Figs.

[52] U.S. Cl. .......... 178/5.4, 178/5.2, 178/6.6
[51] Int. Cl. .......... H04n 9/44
[50] Field of Search .......... 178/5.2, 5.4, 5.4sync, 5.4P, 69.5DC

[56] References Cited
UNITED STATES PATENTS

| | | | |
|---|---|---|---|
| 2,689,880 | 9/1954 | Hollywood | 178/5.4 |
| 2,820,091 | 1/1958 | Parker et al. | 178/5.4(sync) |
| 3,392,231 | 7/1968 | Schonfelder | 178/69.5(DC) |

*Primary Examiner*—Richard Murray
*Attorney*—Ernest F. Marmorek

ABSTRACT: This invention relates to color television and more particularly to the storing of composite color signals coded in accordance with the PAL-AB system, as, for example, on a tape. According to one aspect of the present invention, there is provided a method and apparatus for storing and utilizing composite color signals coded in accordance with the PAL-AB system, wherein every fourth successive field is characterized by an identification signal which is derived from a composite color signal and recorded, and is subsequently employed to control not only line and field synchronization with another composite color signal but also to effect agreement of the fields of both composite color signals with regard to their vertical, horizontal and color synchronizing signal components, for reproduction of the color pictures in desired controlled mutual relation.

Inventor:
Hubert Förster, by
Ernest F. Marmorek,
His Attorney.

Inventor:
Hubert Förster,
by
[signature]
His Attorney.

Inventor:
Hubert Förster,
by
[signature]
His Attorney.

METHOD OF STORING COMPOSITE COLOR SIGNALS

This invention relates to color television and more particularly to the storing of composite color signals coded in accordance with the PAL-AB system, as, for example, on a tape.

In the PAL-AB system, the color sync signal burst is transmitted in consecutive line periods with alternating phase positions. Consequently, the color sync signal can serve in the receiver not only for synchronizing the color carrier oscillator, but also for deriving what may be termed a "marker" impulse for determining the polarity of the line sequence switch.

The successive fields of the PAL-AB composite color signal differ not only with regard to the position of the vertical field sync pulse in relation to the horizontal or line sync pulse, due to interlacing, but differ also by the phase position of the color sync signal in relation to the position of the vertical sync pulse. Hence, fields have mutually identical conditions with regard to the positions of the three sync pulses, namely, the vertical sync pulse V, the horizontal sync pulse H and the color sync pulse, occur only every fourth successive field.

A problem which arises in storing PAL-AB composite color signals is that of synchronizing stored signals, from one source, with stored signals from other sources, or with "live" signals from a television studio, for example, in such manner that the signals from the store are in proper operating synchronism with the signals from the other sources or from the studio, namely, that synchronism occurs with regard to the position of all synchronizing impulses in every field.

It is therefore among the principal objects of the invention to provide a method and apparatus that avoid the aforesaid problem.

Further objects and advantages of the invention will be set forth in part in the following specification and in part will be obvious therefrom without being specifically referred to, the same being realized and attained as pointed out in the claims hereof.

According to one aspect of the present invention, there is provided a method for storing and utilizing composite color signals coded in accordance with the PAL-AB system, wherein every fourth successive field is characterized by an identification signal which is derived from a composite color signal and recorded, and is subsequently employed to control not only line and field synchronization with another composite color signal but also to effect agreement of the fields of both composite color signals with regard to their vertical, horizontal and color synchronizing signal components, for reproduction of the color pictures in desired controlled mutual relation.

According to another aspect of the present invention, there is provided an apparatus for carrying out the method set forth above, said apparatus comprising means for characterizing every fourth successive field by an identification signal derived from a composite color signal, and means for employing said identification signal to control not only line and field synchronization with another composite color signal but also to effect agreement of the fields of both composite color signals with regard to their vertical, horizontal and color synchronizing signals.

The invention has the advantage of enabling fading in and out and mutual replacement of pictures from a store and from other different sources without difficulty or mutual interference and without affecting or having to alter the position of the sync pulses in a composite color signal corresponding to a picture which is to be faded in in replacement of a picture already being reproduced from a store.

The invention can be carried into practice in various different ways. In one way, derivation of an identification signal, from the composite color signal taken from the store, may be effected for derivation of the "marker" signal for polarity control of the line sequential switch in a cooperating color television receiver. This may be done by producing a series of impulses of alternating polarity by synchronized demodulation from the color sync signal blanked out of the composite color signal by means of a gate. In another method, the control voltage for the phase discriminator controlling the color carrier oscillator may be used for producing a "marker" signal. The resonant circuit of the color carrier oscillator is, in practice, of high quality, that is high Q, and therefore this oscillator oscillates on the mean phase position of the two alternating phases of the color sync signal. The control voltage, formed by phase comparison of the color carrier oscillator with the alternating color sync signals, is therefore of sawtooth wave form with alternating polarity, and from this wave form the marker signal can be obtained wither directly or through a filter. See, for example, W. Bruch, Neuere Entwicklungen fuer das PAL-Farfernsehuebertragungsverfahren, Funktechnik 1966, No. 5, pp. 154—160. (Some Recent Developments in the PAL Colour TV System, TELEFUNKEN-ZEITUNG, Special Edition, Jun. 1966, pp. 2.1—2.10).

In a PAL-AB composite color signal of this standard, the blanking of the color sync signals is effected in successive fields in the vertical blanking intervals with a time shift such that in each field the sequence of the color sync signals terminates with the same phase and starts again after blanking with a color sync signal with the same phase position. This property of the PAL-AB composite color signal is utilized for producing the identification signal.

In utilizing the invention in practice, the identification signal may be used for producing coincidence between the composite color signal taken from the store and a secondary signal from some other source of television signals, or pulse sequences taken from signals from a color television studio, and corresponding in position with all the synchronizing signals. To this end, in addition to the customary synchronizing of both signals with regard to the positions of the vertical and horizontal sync pulses, synchronization is also effected with regard to the identification signal. The synchronization may be effected, in known manner, by comparing the phase position of the identification signals in both composite color signals to derive a control signal which exercises such control of the operating speed of the store means as to ensure that the fields coincide in both composite color signals.

Derivation of the identification signals from the composite color signal taken from the store may be effected in known manner, or by a method to be described later herein. The identification signal can also be derived from the composite color signal to be stored and recorded additionally thereto in the store. When the stored signal is extracted it is then no longer necessary to derive the identification signal from the composite color signal taken from the store, for the stored identification signal can be used directly for synchronizing. In the case of color television studio signals, the identification signal may be derived from the synchronizing signal and the PAL marker impulses. If the PAL vertical blanking impulses are also available in the color television studio, the identification signal can be derived from there.

For a fuller understanding of the nature and objects of the invention, reference should be had to the following detailed description, taken in connection with the accompanying drawings, in which.

Figure 1:
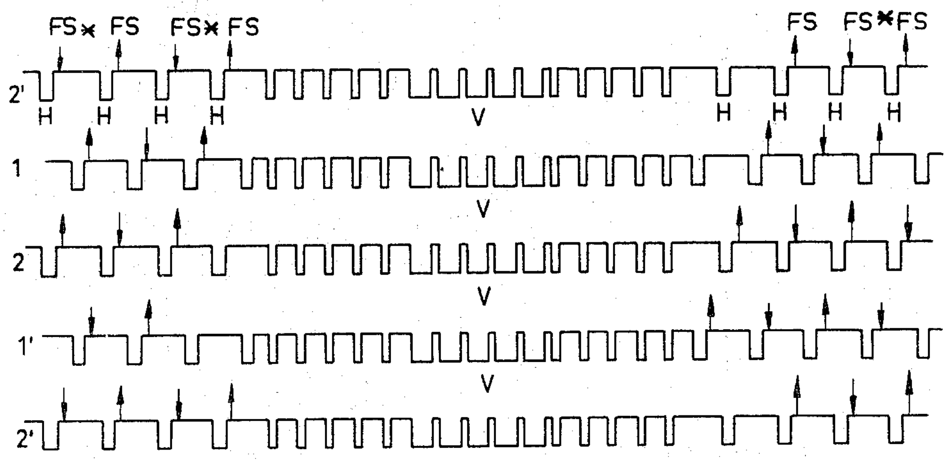
FIG. 1 shows the synchronizing signals in the vicinity of the vertical synchronizing signals in successive fields in a composite color signal according to the PAL-AB standard.

FIG. 1 shows the synchronizing signals of a PAL-AB composite color signal for a color picture signal with 625 lines and 50 fields per second, in successive fields. In accordance with the standard, five impulses are always transmitted at double the line frequency before and after the vertical sync pulse V, and the vertical sync pulse V is also interrupted by impulses of double the line frequency. During the remaining part of each line period horizontal sync pulses H are transmitted. The figure shows the synchronizing signals only in the vicinity of the vertical sync pulses. For synchronizing the picture signal, which is an interlaced picture, the position of the vertical sync pulse V is shifted in successive fields 1, 2, or 1′, 2′ respectively, by a half-line period, in relation to the line periods characterized by the horizontal sync pulses H. For synchronizing the color carrier generator in the receiver during the horizontal blanking periods, the color synchronizing signal FS is transmitted following the horizontal impulse H in the form of trains of oscillations consisting of several cycles of the color carrier frequency. In the PAL-AB system, the phase position of the color synchronizing signal FS or FS* alternates in successive line periods by 90° (±45°), indicated in the figure by the direction of the arrows which conventionally represent the color synchronizing signal. During the vertical blanking periods no color synchronizing signals are transmitted.

Due to the interruption of the regular sequence of the color synchronizing signals, transients of the control voltage for the color carrier oscillator will occur and in order to make these substantially alike in all fields to comply with present proposed standards, the blanking of the color synchronizing signals during the vertical blanking period in the four consecutive fields 1, 2, 1′, 2′, which are not identical with regard to the three synchronizing signals V, H and FS, is so shifted in time that in each field, the sequence of the color synchronizing signals terminates with a color synchronizing signal of the same phase, and starts again, after blanking, with a color synchronizing signal of the same phase. By agreement, for characterizing the identical fourth fields, the frame 2′, in which the horizontal and vertical sync pulses do not coincide and the first color sync signal after the bhnking has the greatest time spacing from the vertical synchronizing signal, is chosen.

Figure 2:
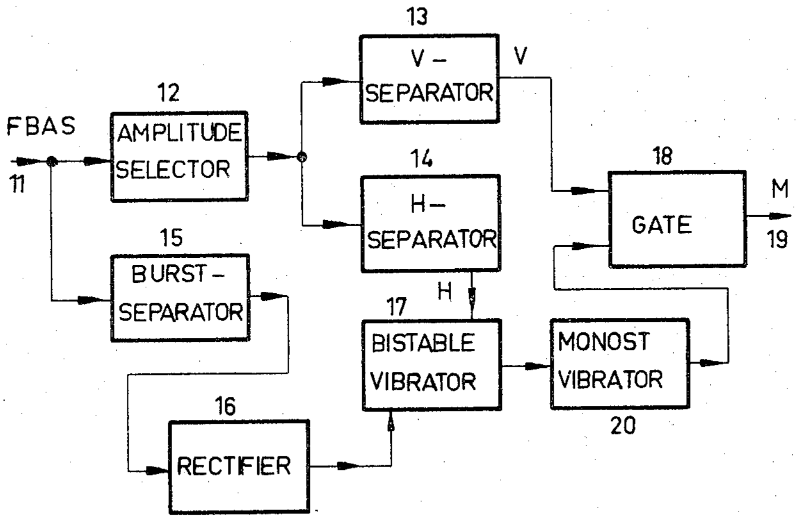
FIG. 2 is a block diagram of an arrangement for producing the identification signal from a PAL-AB signal according to FIG. 1.

FIG. 2 is a block diagram of one arrangement for deriving the identification signal. The PAL-AB composite color signal FBAS is applied at 11 and the synchronizing signal S is filtered out of it by an amplitude selector 12 and split by known means at 13 or 14, respectively, into the vertical sync signal V and the horizontal sync signal H. The color synchronizing signal FS (FIG. 1) is separated out of the composite color signal FBAS by known means at 15. These known means (not separately show) comprise a gate circuit controlled by impulses derived from the horizontal sync impulses. By rectification in the block 16 of oscillations of the color carrier frequency there is obtained an impulse of the duration of the color synchronizing impulse and this is used to trigger a bistable vibrator 17. The first horizontal synchronizing impulse following the last color synchronizing signal and supplied from 14 switches the bistable vibrator 17 back into its initial state. The impulse produced by the bistable vibrator 17 is applied to a gate 18 to which is fed the vertical sync pulse V from 13The gate 18 is a coincidence gate providing an output only when its two input impulses coincide in time.

The operation of FIG. 2 will now be explained with reference to FIG. 1. It may be seen from FIG. 1 that, during the field periods 1, 2, 1′, the last color synchronizing signal FS before the start of the vertical blanking is followed by a horizontal synchronizing impulse H (having a duration 4.7 μsec. with the present European Standard) during the next line period. The bistable vibrator 17, which has been switched over by the color synchronizing impulse from its original state, is therefore again returned to the original state in the field periods 1, 2 and 1′ by the horizontal sync pulse of the next line period, so that the impulse produced by the bistable vibrator 17 during the field periods 1, 2 and 1′ is terminated before the vertical sync pulse occurs, and the gate 18 does not, therefore, supply an output signal. Only during the field period 2′ (FIG. 1) will no horizontal sync pulse follow the last color synchronizing signal before the start of blanking. The vibrator 17 previously switched over by the color synchronizing impulse will be returned to its original state only by the first occurring main sync block of the vertical sync pulse. The impulse therefore lasts substantially longer than in the other field periods. This impulse triggers a monostable vibrator 20 which is adapted to produce an impulse of a width of half a line period. This is present when the vertical sync pulse occurs, so that the latter can pass the gate 18, and an identification impulse M characterizing the field 2′ occurs at the output terminal 19.

It is necessary for the operation as described above to occur so that the bistable vibrator is not switched over by the preliminary double line frequency sync block of the vertical sync pulse. However, since these blocks have only one-half of the width of the horizontal sync pulses, it is possible, by partial vibrator 17, to ensure that the sync blocks referred to, namely the auxiliary pulses of shorter width, are not effective to change over the bistable vibrator 17.

Figure 3:
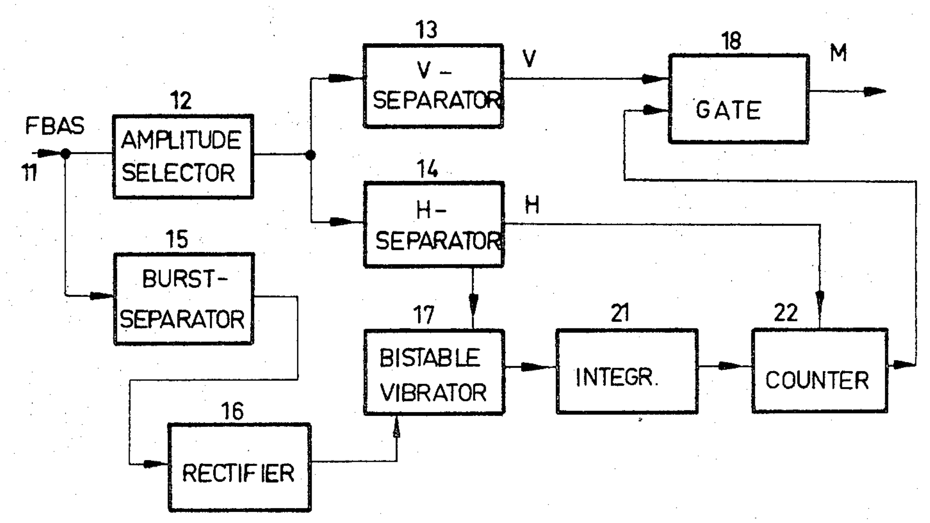
FIG. 3 is a block diagram of another arrangement for producing the identification signal from a PAL-AB composite color signal according to FIG. 1.

FIG. 3 shows another arrangement for producing the identification signal characterizing the field 2′ (FIG. 1). The PAL-AB composite color signal FBAS at 11 is applied in the same way as in FIG. 2, to the devices 12, 13, 14 and 15, for separating out the color synchronizing signal, and the horizontal and vertical sync pulses, and for producing in the device 16 an impulse of the duration of the color synchronizing signal. This impulse again switches over bistable vibrator 17 which is returned to its initial state by the device 14 by the next horizontal sync pulse. The impulse from the bistable vibrator 17 is applied after integration by an integrating circuit 21 to a counter 22, which is started by the leading edge of this impulse and delays it for three line periods. In order to achieve this the counter 22 is fed with additional horizontal sync pulses from 14. The thus delayed impulse from the counter 22 and the vertical sync pulse from 13 are applied respectively to the two inputs of a coincidence gate 18 which, when these inputs occur together, produces the identification signal M for the field 2′ (FIG. 1).

As may be seen from FIG. 1, the impulse is delayed by three line periods and triggered off by the last color synchronizing signal before the vertical blanking terminates in the fields 1, 2 and 1′ before the occurrence of the vertical sync pulse. Only in the field 2′ does this delayed impulse coincide in time with the vertical sync pulse and cause the gate 18 to provide an output identification signal pulse M.

Figure 4:
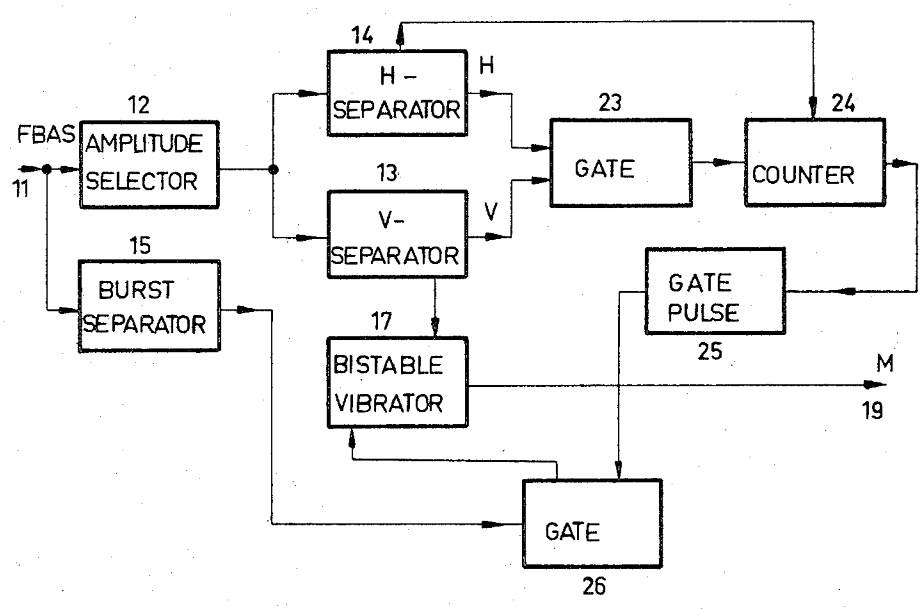
FIG. 4 is a block diagram of yet another arrangement for producing the identification signal from a PAL-AB composite color signal according to FIG. 1.

In the arrangement of FIG. 4, the first color synchronizing signal after the vertical blanking is used for yielding the identification or marker impulse M for the field 2′. In the same way as in FIGS. 2 and3, the horizontal and vertical sync pulses and the color synchronizing signal FS are separated out of the PAL-AB composite color signal FBAS.

The impulses H and V supplied by the devices 13 and 14, respectively, are applied to a coincidence gate 23 which supplies an output signal only when the signals H and V coincide in time. The output signal from the gate 23 is delayed by a counter 24 by four line periods, the counter receiving also horizontal synchronizing impulses from the device 13 to enable this to be done. The impulse from the counter 24 corresponds in time with the impulse H, and from it a device 25 produces a gating impulse of a duration of, for example, 10 μsec., long enough to extend for the duration of the color synchronizing impulse following the H signal. This gating impulse is employed to open a gate 26 to which the color synchronizing signal from the device 15 is fed. If the gating impulse and the color synchronizing signal occur at the same time an output impulse is given by 25 and this switches over a bistable vibrator 17 which is returned to its original state by the following V impulse from the device 14. The timing of this return of the bistable, corresponding to the time position of the V impulse, represents the information for the field 2' (FIG. 1) and may be taken from the bistable vibrator 17.

The operation of FIG. 4 will now be explained with reference to FIG. 1. The gate 23 supplies in the fields 1 and 1' an output impulse, the timing of which corresponds to the second sync block or auxiliary pulse following the start of the V impulse. This delay is due to the integration effect in the production of the V impulse. From this moment the counter 24 counts four line periods and then supplies an output impulse which initiates a gating impulse of 10 μsec. width for the gate 26. A color synchronizing signal occurs within this gating impulse only in the field 1', and this is the first signal following the vertical blanking. In all other fields, the color synchronizing signals appear at least a half-line period later. Hence it is only during the line period 1' that the bistable vibrator 17 is switched over. The bistable vibrator 17 remains in this state until it is returned by the next V impulse in the following field 2'. This return characterizes the position in time of the identification signal M.

Figure 5:
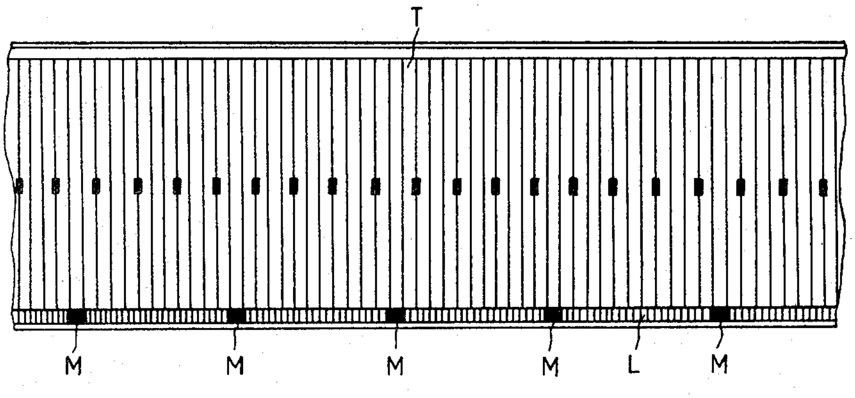
FIG. 5 is a diagrammatic representation of part of the length of a magnetic tape with the composite color signal stored in transverse tracks across the tape and a control signal and the identification signal stored in a longitudinal track.

FIG. 5 represents a short length of magnetic tape in which the composite color signal is stored in transverse tracks. This recording is effected in known manner by magnetic tape recorders as commonly used in television studios, in which the recording of the television signal is effected by four magnetic heads mounted on the periphery of a rotating wheel, the axis of which is parallel to the longitudinal axis of the tape, the arrangement being such that the four heads record four successive transverse tracks. For recording a television signal in accordance with the present European television standard (625 lines, 50 fields per second) the wheel rotates at 15,000 r.p.m. (250 r.p.s.). For coupling rotation of the wheel with the longitudinal advance of the magnetic tape a control signal of the corresponding frequency (250 c.p.s.) is recorded in a longitudinal track L on the magnetic tape T.

In one arrangement the identification impulse M for marking every fourth field (and derived in any of the ways above denoted from the PAL-AB composite color signal) is also recorded on the longitudinal track L in addition to the aforesaid control signal. When "reading off" the tape to obtain the stored composite color signals, these identification impulses serve for correctly synchronizing the field with some other signal in accordance with the PAL-AB system or with the impulse sequences for synchronizing a PAL color television studio.

Figure 6:
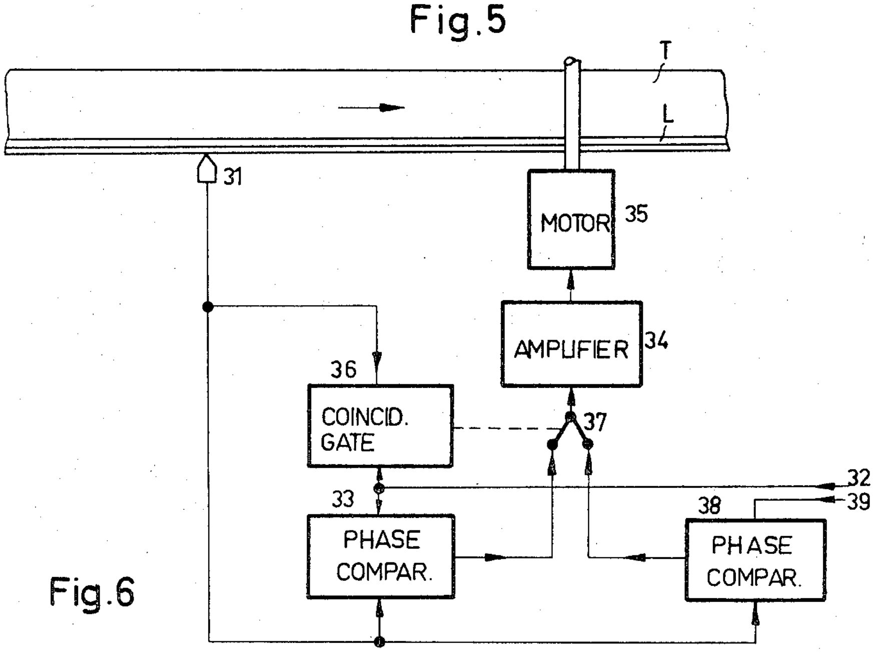
FIG. 6 shows diagrammatically means for synchronizing the composite color signal taken from a magnetic tape as in FIG. 5 with another signal as regards the positions of the identification signal in both composite color signals.

FIG. 6 shows diagrammatically an arrangement for synchronizing the composite color signal taken from a recorded magnetic tape as in FIG. 5 with an external signal so that both signals agree in every field with regard to vertical, horizontal and color synchronizing signals. The arrangement of FIG. 6 is used in addition to the usual servocontrols for the head wheel and tape advance. The signal recorded in the longitudinal track L is taken by a fixed magnetic head 31. The identification impulses contained in this signal and (assuming the European television standard) a frequency of 12.5 c.p.s. are compared in phase in a phase comparator 33 with reference impulses of the same frequency. These reference impulses are derived from the external signal 32 with which the composite color signal taken from the magnetic tape is to be synchronized, or may be produced from the impulse trains available in a PAL color television studio. The phase comparator 33 supplies an output difference or control voltage which depends on the phase difference between its two inputs. This is amplified (when the switch 37 is in the left-hand position shown in FIG. 6) by an amplifier 34 whose output controls a drive motor 35 to drive the tape T in the longitudinal direction so that the fields of the composite color signals read off the magnetic tape T by means of a head on the wheel (not shown) will coincide with the external signal 32 with regard to all three synchronizing signal components. The control of the speed of the motor 35, and therefore of the longitudinal speed of the tape T, is such that the motor speed is varied from its nominal value until the head detects the field corresponding to the correct field in the external signal 32.

Owing to the low frequency of the identification signal (in the European color television standard it is only 12.5 c.p.s.) corresponding to a quarter of the field frequency (50 c.p.s.), it is difficult to make this control other than so slow as to lack the required accuracy. In order to shorten the time taken to achieve exact coincidence between the position of the magnetic tape and the nominal position, a fine speed control is also provided. After approximate agreement is attained by means of the control voltage derived from the identification signals, fine control by means of a control signal recorded on the longitudinal track and of much higher frequency (250 c.p.s. in the case of the European television standard) is obtained. The frequencies of the identification signal and of the control signal are integrally related (in the ratio of 12.5 : 250 = 1 : 20 in the case of the standard here in question). When the identification signals are in approximate temporal agreement, a coincidence gate 36 supplies an output signal. This signal controls the two-way switch 37 (as indicated diagrammatically by the broken line) which switches the input of the amplifier 34 from 33 to the output of a second phase comparator 38 which phase compares the control frequency taken off the longitudinal track L of the magnetic tape T by the head 31 with a reference frequency (from a source not shown) fed in over the lead 39.

Figure 7:
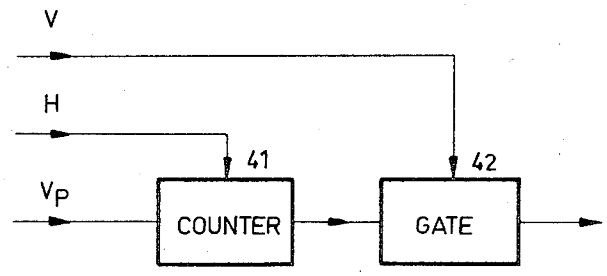
FIG. 7 shows diagrammatically a device for deriving the identification signal from the horizontal and vertical sync pulses available in a color television studio, and the PAL blanking impulses.

FIG. 7 shows diagrammatically an arrangement for producing the identification signal for the case in which the color television studio provides PAL blanking impulses (VP) in addition to the vertical and horizontal sync pulses V and H. The leading edges of the PAL blanking impulses, which are always displaced in time in four consecutive fields by half a line period each, are delayed by three line periods by means for a counter 41 controlled by the horizontal sync pulses. Since the blanking impulse starts only in the field 2' (FIG. 1) three line periods in front of the vertical sync pulse and, in the remaining three out of four fields always starts half a line period earlier, the leading edge of the blanking impulse, delayed by three line periods, will coincide with the vertical sync pulse only in the frame 2'. This coincidence is detected by a coincidence gate 42 which, when coincidence occurs, supplies an output impulse which constitutes the identification signal and occurs only every fourth field, corresponding to the field 2'. In FIG. 6 this identification signal is used as a reference signal for comparison with the identification signal taken from the control track. Other means, known per se, may be used for effecting comparison.

The identification signal may also be derived in similar manner from the external signal if the latter only is available and synchronous signals synchronized therewith are not.

I wish it to be understood that I do not desire to be limited to the exact details of construction shown and described, for obvious modifications will occur to a person skilled in the art.

I claim:

1. A method of storing composite color signals coded in accordance with the PAL-AB system, which method consists in characterizing every fourth successive field by an identification signal and then employing said identification signal to control line and field synchronization of one composite color signal with another composite color signal, and also to effect agreement of the fields of both composite color signals with regard to their vertical, horizontal and color synchronizing signal components.

2. A method as claimed in claim 1, including the step of deriving the identification signal from a composite color signal, in accordance with a PAL-AB system, by utilizing the time difference between the vertical sync pulse and the last color synchronizing signal before blanking.

3. A method as claimed in claim 1, including the step of deriving the identification signal from a composite color signal in accordance with a PAL-AB system, by utilizing the time difference between the vertical sync pulse and the first color synchronizing signal after blanking.

4. A method as claimed in claim 1, including the step of synchronizing the identification signals in time with the field sync pulses.

5. A method as claimed in claim 1, wherein the identification signal is derived from the horizontal, vertical, and blanking impulses available in a PAL color television studio, which method includes the step of delaying the leading edge of the blanking impulse for three line periods time by line sync pulses, then time-matching said delayed impulse with the vertical sync pulse for coincidence, and generating a coincidence signal as the identification signal.

6. Apparatus for storing composite color signals, coded in accordance with the PAL-AB system, comprising:
- means operable for characterizing every fourth successive field by an identification signal and then employing said identification signal to control line and field synchronization of one composite color signal with another composite color signal;
- means operative for effecting agreement of the fields of both composite color signals with regard to their vertical, horizontal and color synchronizing signal components;
- a magnetic tape having color signals recorded in transverse tracks in related sequential order, with an identification signal recorded on the tape in time relation with regularly periodic ordered signals in said transverse tracks;
- a longitudinal reading head;
- means for moving said tape longitudinally with reference to said reading head;
- a source for a reference time signal;
- means for recording said identification signals from said track and comparing said signals timewise with a reference time signal from said source, to generate a difference signal; and
- amplifier means responsive to said difference signal to control the means for moving said tape to control the speed of motion of said tape.

7. Apparatus as in claim 6, including: further,
- means for reading the signal records in said transverse tracks, including a plurality of transverse reading heads;
- a rotatable wheel supporting said transverse reading heads for movement transverse to said tape and linearly relative to said transverse signal records;
- driving motor means for said wheel; and
- a longitudinal track on said tape containing said identification signals recorded in said track, and said track containing additional control signals recorded to be detected by said longitudinal reading head for controlling said motor means for driving said wheel.

8. Apparatus as in claim 7, including: further,
- means constituting auxiliary fine control means for controlling the longitudinal tape-moving means; and
- means responsive to said difference signals for controlling said auxiliary fine control means for controlling said tape-moving means.

9. Apparatus for storing composite color signals coded in accordance with the PAL-AB system, comprising:
- means for recording line signals for a field, with designated fields in sequence, and for characterizing every fourth successive field by an identification signal derived from a composite color signal; and
- means responsive to said identification signal to control horizontal and vertical synchronization with another composite color signal, and to establish agreement of the fields of both composite color signals with regard to their vertical, horizontal and color synchronizing signals.

10. Apparatus as claimed in claim 9, including: means responsive to the time difference between the vertical sync pulse and the last color synchronizing signal after blanking for deriving the identification signal from a composite color signal in accordance with a PAL-AB system.

11. Apparatus as claimed in claim 9, including: means responsive to the time difference between the vertical sync pulse and the first color synchronizing signal after blanking for deriving the identification signal from a composite color signal in accordance with a PAL-AB system.

12. Apparatus as claimed in claim 9, including:
- means for blanking out the color synchronizing signal from the composite color signal;
- means for separating out the synchronizing signal;
- means for producing vertical and horizontal sync pulses from said synchronizing signal;
- a bistable vibrator;
- means operable for deriving a pulse from said synchronizing signal and for directing said pulse to operate said bistable vibrator;
- means for extracting a line sync pulse from the composite color signal and for applying said line sync pulse to restore said bistable vibrator;
- a monostable vibrator connected to be triggered by pulses from said bistable vibrator, for producing an output impulse having a duration of half a line; and
- a coincidence gate responsive to said output impulse pulse from said monostable vibrator and to said vertical sync pulse from said synchronizing signal for producing an identification signal.

13. Apparatus as claimed in claim 9, including:
- means for blanking out the color synchronizing signal from the composite color signal;
- means for separating out the synchronizing signal;
- means for producing vertical and horizontal sync pulses from said synchronizing signal;
- a bistable vibrator;
- means operable for deriving a pulse from said synchronizing signal and for directing said pulse to operate said bistable vibrator;
- means for extracting a line sync pulse from the composite color signal and for applying said line sync pulse to restore said bistable vibrator;
- means for receiving and integrating pulses from said bistable vibrator, to produce an integrated pulse;
- counting means for receiving said integrated pulse and providing a delay of three line periods in outputting said integrated pulse; and
- means for supplying said output integrated pulse and said vertical sync pulse to said coincidence gate to obtain said identification signal.

14. Apparatus as in claim 9, including:
- means for blanking out the color synchronizing signal from the composite color signal;
- means for separating out the synchronizing signal;
- means for producing vertical and horizontal sync pulses from said synchronizing signal;
- a bistable vibrator;
- a coincidence gate;
- means for applying said vertical and said horizontal sync pulses to said gate to produce an output pulse;
- counting means for receiving a line sync pulse and said coincidence gate output pulse to produce a delayed pulse;
- a second gate;
- means for applying the color synchronizing pulse to said second gate and for applying said delayed pulse from said counting means to open said second gate to produce an output pulse; and
- means for applying said output pulse from said second gate and said delayed pulse from the counting means, both, to said bistable vibrator to operate and to restore said bistable vibrator to produce an output identification signal.

15. Apparatus as claimed in claim 9, including:
- means for recording one set of color signals in transverse tracks on a moving magnetic tape;
- means for recording identification signals on said tape; and
- means for time-comparing identification signals on the tape with corresponding signals on another color signal to produce a differential control signal for controlling the running speed of the tape.

16. Apparatus as claimed in claim 15, including: means for driving a wheel transversely movable of said tape; magnetic heads on said wheel; means for driving the tape longitudinally; all said drives being controlled from a control signal recorded longitudinally on said magnetic tape, said tape also carrying identification signals recorded on longitudinal tracks.